United States Patent [19]

Krasij et al.

[11] Patent Number: 5,264,299

[45] Date of Patent: Nov. 23, 1993

[54] PROTON EXCHANGE MEMBRANE FUEL CELL SUPPORT PLATE AND AN ASSEMBLY INCLUDING THE SAME

[75] Inventors: Myron Krasij, Avon, Conn.; Paul R. Watson, Duncansville, Pa.

[73] Assignee: International Fuel Cells Corporation, Hartford, Conn.

[21] Appl. No.: 813,472

[22] Filed: Dec. 26, 1991

[51] Int. Cl.$^5$ ............................................... H01M 8/10
[52] U.S. Cl. .................................... 429/30; 429/33; 429/34
[58] Field of Search ............................... 429/30, 33, 34

[56] References Cited

U.S. PATENT DOCUMENTS 4,950,562  8/1990  Yoshida et al. .................. 429/32

Primary Examiner—Olik Chaudhuri
Assistant Examiner—M. Nuzzolillo
Attorney, Agent, or Firm—Peter R. Ruzek

[57] ABSTRACT

A support plate for a proton exchange membrane fuel cell includes a porous support body that has a central portion and a peripheral portion integral with and circumferentially completely surrounding the central portion, and a sealing body of elastomeric sealing material that completely fills the pores of the peripheral portion to make it impermeable to fluids. The support plate may be assembled with another one and with a proton exchange membrane interposed between the two support plates to form an assembly, and the sealing body then peripherally joins and seals the assembly and fills any gaps that may be present between the peripheral portions due to the absence of the membrane from such regions and thus to peripherally encapsulate the membrane.

10 Claims, 1 Drawing Sheet

PROTON EXCHANGE MEMBRANE FUEL CELL SUPPORT PLATE AND AN ASSEMBLY INCLUDING THE SAME

DESCRIPTION

1. Technical Field

The present invention relates to fuel cells in general, and more particularly to support plates for use in proton exchange membrane fuel cells and to an assembly including such support plates.

2. Background Art

There are already known various constructions of fuel cells, among them such employing a proton exchange membrane confined between respective cathode and anode electrode plates. The general principles of construction and operation of such fuel cells are so well known that they need not be discussed here in any detail. Suffice it to say that a gaseous fuel and an oxidizing gas are supplied to the anode electrode plate and to the cathode electrode plate, respectively, and distributed as uniformly as possible over the active surfaces of the respective electrode plates (that is, the electrode plate surfaces facing the proton exchange membrane, each of which is usually provided with a layer of a catalyst), and that an electrochemical reaction takes place at and between such electrode plates, with attendant formation of a product of the reaction between the fuel and oxygen, release of thermal energy, creation of an electrical potential difference between the electrode plates, and travel of electric charge carriers between the electrode plates, with the thus generated electric power usually constituting the useful output of the fuel cell.

In the proton exchange membrane fuel cells of the type here under consideration, each of the electrode plates typically includes a backing plate having a relatively substantial thickness and a separate relatively thin support plate that is provided with the catalyst layer at an active region of one of its major surfaces (referred to herein as the front surface) and that overlies at least a central portion of the backing plate. These backing and support plates have one thing in common, namely, that they are porous. Such porosity is needed to supply to and substantially uniformly distribute over the respective active surface the respective gaseous medium which is fed through respective channels provided in the backing plate to areas of the respective electrode plate that are spaced from the proton exchange membrane, but also to provide for removal of the reaction product (water) from one of the active surfaces and supply of water to the other of the active surfaces to avoid drying out of the proton exchange membrane thereat.

It will be appreciated that, when porous elements such as the aforementioned electrode plates are used in fuel cells, it is necessary to assure that neither any liquid, such as liquid electrolyte, nor any of the gaseous media, be able to flow out of the periphery of the respective porous element. In this respect, the possibility of the gaseous media escaping through or even reaching the periphery of the respective porous element is a more serious one of the conditions to be prevented, not only because such escape would result in a loss of a portion of the respective supplied gaseous medium with attendant reduction in the operating efficiency of the fuel cell, but also, and possibly more importantly, because the mixture of the gaseous fuel with the oxidizing gas or with ambient air could create a safety concern.

In recognition of this situation, it was already proposed, for instance in the U.S. Pat. No. 4,555,324 to Ueno et al, to externally coat each of at least some of the edge portions of fuel cell electrode plates with a layer of polytetrafluoroethylene or a similar substance. This layer, at least in theory, prevents both liquids and gases from passing therethrough and thus from reaching the outer periphery of the thus coated electrode plate edge portion. However, experience has shown that, as advantageous as this approach may seem at the first glance, serious problems are encountered when it is attempted to implement this approach in practice, especially as far as the structural integrity and gas impermeability of the thus coated edge portion is concerned.

Another solution to this problem is disclosed, for example, in the U.S. Pat. No. 4,652,502 to Breault et al. This solution is based on the recognition of the fact that no serious detriment is encountered when a liquid is permitted to reach the periphery of the respective electrode plate, so long as it is assured that this liquid is prevented by capillary forces from actually flowing out through such periphery. Based on this recognition, it is disclosed there that the edge regions of the electrode plates are densified by the introduction into the pores of such regions an impregnating liquid substance which, after curing or similar treatment, leaves behind a residue that only partially fills the pores but permits liquid to penetrate into and fill the remainder of such reduced-size pores, thus forming a so-called wet seal. This wet seal and the surface tension or capillary forces associated therewith then prevent any gaseous medium from penetrating from the interior to the exterior of the respective electrode element. Even here, however, the results are less than satisfactory, if for no other reason then because the liquid electrolyte or other liquid constituting the wet seal is able to reach the outer periphery of the fuel cell and, for instance, evaporate therefrom or cause other deleterious consequences.

Such problems are avoided by adopting an approach such as that disclosed, for instance, in the U.S. Pat. No. 4,640,876 to Warzawski et al where the plate-shaped porous electrode element is mounted in or on or supported by a solid frame which is separate and distinct from the electrode element but which is contiguous to the electrode element and completely circumferentially surrounds the same, thus in effect forming a plate-shaped fuel cell component therewith. Inasmuch as the frame, being solid, is impermeable to both liquids and gases, and because any interfaces between the frame and the plate surrounded thereby and/or between the adjacent frames juxtaposed with one another in a stack, can be sealed, the possibility of escape of any fluid, be it gas or liquid, to the periphery of the aforementioned plate-shaped fuel cell component can be avoided.

However, an arrangement like this also suffers of several disadvantages which, albeit different from those discussed above, at least partially detract from the technical and/or commercial feasibility of this approach. So, for instance, the very existence of the interfaces between the frame and the plate-shaped element, which must be sealed to prevent internal gas flow, adds to the complexity of the arrangement. Also, if for no other reason then to avoid fluid leakage out of the arrangement through the support plates, they are customarily made smaller than the backing plates and are accommodated in respective recesses of the backing plates. Moreover, each of the backing plates is typically received at its periphery in a recess of the associated frame. This means that shear stresses can occur at such locations.

Accordingly, it is a general object of the present invention to avoid the disadvantages of the prior art.

More particularly, it is an object of the present invention to provide a support plate for use in a proton exchange membrane fuel cell, which support plate does not possess the disadvantages of the known support plates of this kind.

Still another object of the present invention is to develop the support plate of the above kind in such a manner as to minimize if not eliminate fluid escape to and out of its periphery.

A concomitant object of the present invention is to devise a proton exchange membrane assembly having a pair of the support plates of the type here under consideration, which assembly is constructed in such a manner as to avoid all of the disadvantages of the previously used approaches.

It is yet another object of the present invention to design the assembly of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a plate-shaped fuel cell component which includes a pair of substantially coextensive porous support plates each including a central portion and a peripheral portion integral with and circumferentially completely surrounding the central portion, and a proton exchange membrane interposed between at least all of the central portions of the support plates to form a sandwich assembly therewith. In accordance with the invention, there is further provided a body of elastomeric sealing material joining the sandwich assembly at the peripheral portions of the support plates and forming a circumferentially complete fluid-impermeable seal thereat. The sealing material of the body completely fills the pores of the peripheral portions to make the peripheral portions completely fluid-impermeable.

In accordance with another aspect of the present invention, there is provided a support plate for a proton exchange membrane fuel cell. The support plate includes a porous support body having a central portion and a peripheral portion integral with and circumferentially completely surrounding the central portion, and a sealing body of elastomeric sealing material that completely fills the pores of the peripheral portion to make the peripheral portion completely fluid-impermeable.

BRIEF DESCRIPTION OF THE DRAWING

The present invention will be described in more detail below with reference to the accompanying drawing, in which.

BEST MODE FOR CARRYING OUT THE INVENTION

Figure 1:
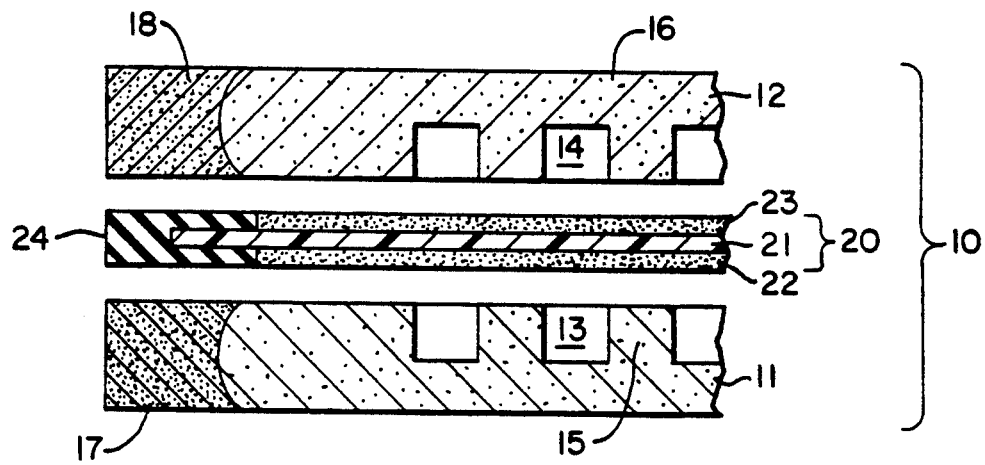
FIG. 1 is an exploded cross-sectional view of a fragment of a fuel cell incorporating a proton exchange membrane component embodying the present invention.

Referring now to the drawing in detail, and first to FIG. 1 thereof, it may be seen that the reference numeral 10 has been used therein to identify a proton exchange fuel cell in its entirety. The fuel cell 10 as illustrated in the drawing in an exploded condition includes two backing plates 11 and 12 that are shown, and will be discussed in some detail below, merely for the sake of completeness, to depict the environment in which the present invention is being utilized. The reference numeral 20, on the other hand, denotes a proton exchange assembly or sandwich of a proton exchange membrane 21 with support plates 22 and 23 which embodies the present invention and in the condition of the fuel cell 10 is interposed between and in intimate contact with the backing plates 11 and 12.

The backing plates 11 and 12 serve to transmit and withstand axial loads, to conduct electrical current and, in the illustrated construction, also to provide reactant gas channels, such as those indicated at 13 and 14 in FIG. 1 of the drawing, which are bounded and separated from one another by respective partition regions 15 and 16. Graphite is the material favored for the backing plates 11 and 12 that are to be used in the proton exchange membrane fuel cell environment, particularly for its rather high electrochemical stability, light weight, and relatively low cost. The backing plates 11 and 12, as well as the support plates 22 and 23, are constructed as porous bodies to enable or facilitate the distribution of the respective reactant gas to all regions of the respective catalyst that is situated at the surface of the proton exchange membrane 21 facing the respective backing plate 11 or 12, that is, even to those regions that are juxtaposed with the partition regions 15 or 16 or with other regions of the respective backing plate 11 or 12. Moreover, in solid polymer membrane fuel cells 10 with passive water flow management, the porosity of the backing plates 11 and 12 and of the support plates 22 and 23 is also being used to remove product water from one side, and to supply moisturizing water to the other side, of the proton exchange membrane 21, and to provide for the formation of a wet seal that separates the reactant gases from the liquid water system.

However, the porosity of the backing plates 11 and 12 could have disadvantageous consequences if it were permitted to exist in edge regions of such backing plates 11 and 12. To avoid such undesirable consequences, such edge regions are made solid and both liquid and gas impermeable. In the proton exchange membrane fuel cell 10 shown in FIG. 1 of the drawing, this is achieved in a manner that is disclosed in more detail in a commonly assigned copending U.S. Pat. application Ser. No. 07/813,414, the disclosure of which is incorporated herein by reference in its entirety so that no detailed explanation thereof need be provided here. Suffice it to say that the edge regions of the respective porous backing plates 11 and 12 are made solid and fluid impermeable by impregnating them with respective quantities of an initially flowable but solidifiable material that completely fills the pores of such edge regions and solidifies therein, thus in effect transforming the edge regions of the backing plates into solid, fluid impermeable frame portions 17 and 18.

As already mentioned before, FIG. 1 of the drawing also shows that the proton exchange membrane 21 is sandwiched between the two support plates 22 and 23.

As is well known, the support plates 22 and 23 may carry respective catalyst formations or layers at their major surfaces facing the proton exchange membrane 21. However, such catalyst formations could be provided, instead or in addition, directly on the respective major surfaces of the proton exchange membrane 21. The porous support plates 22 and 23 are shown to extend not only over a central region of the fuel cell 10, that is the active region at which the electrochemical reaction takes place, but also in between the solid frame portions 17 and 18 of the backing plates 11 and 12. As a matter of fact, the support plates 22 and 23, as well as the proton exchange membrane 21, are shown in FIG. 1 of the drawing to be coextensive with the backing plates 11 and 12.

It will be appreciated that, inasmuch as the support plates 22 and 23 are porous to be able to perform their function, at least some of the advantages stemming from resorting to the use of the fluid impermeable frame portions 17 and 18 would be lost if liquids or gases were permitted to escape to the outside of the fuel cell 10 through the edge regions of the support plates 22 and 23. Therefore, in accordance with the present invention, this possibility is avoided by making the edge regions of at least the support plates 22 and 23 fluid impermeable as well.

As illustrated in FIG. 1 of the drawing, a body 24 of an elastomeric material is formed at such support plate edge regions The body 24 is constituted by a quantity of initially flowable material that is caused to penetrate into and completely fill the pores of the support plate edge regions and also to fill the gap existing between such edge regions due to the fact that the proton exchange membrane 21 terminates short of the outer peripheries of the support plates 22 and 23. Thus, the body 24 not only makes the edge regions of the support plates 22 and 23 fluid impermeable and solid, thus in effect converting them into solid and impermeable frame portions, but also encases the proton exchange membrane 21 at its periphery.

Figure 2:
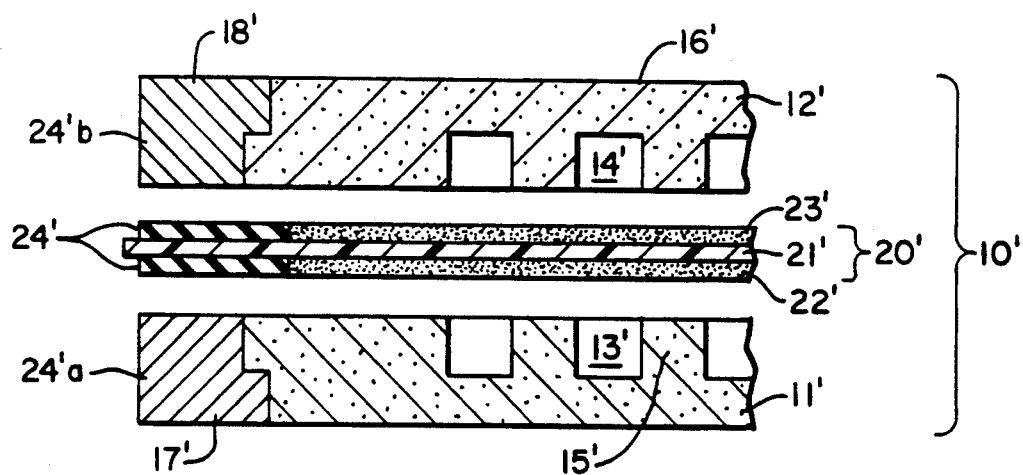
FIG. 2 is a view similar to that of FIG. 1 but of a somewhat modified construction of the component and of the fuel cell.

Turning now to FIG. 2 of the drawing which illustrates a proton exchange membrane fuel cell construction that is similar to that described above in so many respects that the same reference numerals as before but supplemented by primes have been used to denote those parts or portions of the proton exchange membrane fuel cell 10' which structurally and/or operationally correspond to one another, it is to be mentioned that, for illustrative purposes, the porous backing plates 11' and 12' are depicted there as being separate from the fluid impermeable solid frames 17' and 18', respectively, being partially received at their peripheries in respective recesses of such solid frames 17' or 18'. It should be understood, however, that this backing plate/frame construction could be used in conjunction with the assembly 20 of FIG. 1, and that of FIG. 1 could be used with the assembly 20' of FIG. 2.

In the construction of the support plate/proton exchange membrane assembly 20' illustrated in FIG. 2, the proton exchange membrane 21' extends in between the edge regions of the support plates 22' and 23' to such an extent as to be at least flush with or, as shown, to even project beyond the peripheries of the support plates 22' and 23'. In this case, the body 24' of elastomeric material, which in all other respects is identical to that described above, includes two parts 24'a and 24'b each of which is accommodated in and completely fills the pores of the edge region of a different one of the support plates 22' and 23'. Then, the support plates 22' and 23' may be assembled and laminated with the proton exchange membrane 21' to form the unitary assembly or sandwich 24'.

The impregnation of the support plate edge regions with the initially flowable but ultimately solid and elastomeric material of the body 24 or 24' can be accomplished in various known ways, such as by dipping the respective support plate regions in a bath of the liquid impregnating material, causing such material to wick into the pores, or forcing the impregnating material (by applying positive pressure thereto or by drawing it by subatmospheric pressure) into the pores. In any event, the process utilized must be such as to assure complete filling of the pores of the support plate edge regions by the impregnating material but to simultaneously avoid plugging of the pores in the respective central or active regions of the support plates 11 and 12 or 11' and 12'.

It will be appreciated that the type of the impregnating material that is to be used for impregnating and solidifying the support plate edge regions must be chosen with regard to the conditions encountered in the particular fuel cell type during its operation. Of course, since the cured impregnating material may come in contact with various media, such as hydrogen, oxygen, or water during the operation of the fuel cell 10 or 10', it must be invulnerable to such media, that is, it must neither be dissolved by nor react with such media in its solidified state. Moreover, to be able to perform its sealing function when solidified, the impregnating material must not, in the course of the solidifying process, either shrink or release solvents or other gaseous substances that could form interconnected escape passages in the respective support plate edge regions, because such passages would then allow at least some of the aforementioned media to flow therethrough while the fuel cell 10 or 10' is in operation. Also, the solidified impregnating material must be able to withstand, and retain its functions at, the operating temperatures to which it is exposed or caused to reach during the operation of the respective fuel cell 10 or 10'.

Experience has shown that impregnating materials that satisfy the above criteria and are well suited for being used in proton exchange membrane fuel cell applications fall into the general category of silicon rubber. One material that is particularly suited for this use is a silicon resin commercially available from the Dow Chemical Corporation under the designation SYLGARD ® 170 A/B.

The construction described above has a number of important advantages. For one, inasmuch as the solid edge regions of the support plates 22 and 23 or 22' and 23' are constituted by integral portions of the same bodies as the active regions of the support plates 22 and 23 or 22' and 23' that extend in between the frame portions or frames 17 and 18 or 17' and 18' of the backing plates 11 and 12 or 11' and 12', any shear stresses that would be encountered because of the effects of manufacturing tolerances or the like if such support plates 22 and 23 or 22' and 23' were accommodated in respective recesses of the backing plates 11 and 12 or 11' and 12' are eliminated, while those stresses that are attributable to thermal effects are, if not eliminated, then at least greatly reduced. Moreover, inasmuch as the impregnation results in the formation of relatively smooth surfaces at the support plate edge regions, the support plate edge regions can be easily bonded to the associated frame portions or frames 17 and 18 or 17' and 18' of the backing plates 11 and 12 or 11' and 12' thereat, using resin or thermoplastic films or other bonding agents, thus providing leakage-free seals at the respective interfaces. An additional advantage of using an impregnating material that is elastomeric for forming the bodies 24 and 24' is that such bodies are capable of limited deformation, without suffering any appreciable structural damage, to conform to possible surface configuration imperfections of their respective counterparts with which they come in contact and against which they are pressed upon assembly of the fuel cell 10 or 10' or a fuel cell stack, such as those of the frame portions or frames 17 and 18, or 17' and 18' of the backing plates 11 and 12, or 11' and 12', respectively.

While the present invention has been illustrated and described as embodied in support plate/proton exchange membrane assemblies for use in particular fuel cell constructions, it will be appreciated that the present invention is not limited to these particular examples; rather, the scope of protection of the present invention is to be determined solely from the attached claims.

We claim:

1. A plate-shaped proton exchange membrane fuel cell component comprising.
    a pair of substantially coextensive porous support plates each including a central portion and a peripheral portion integral with and circumferentially completely surrounding said central portion;
    a proton exchange membrane interposed between at least all of said central portions of said support plates to form a sandwich assembly therewith; and
    a circumferentially complete body of elastomeric sealing material joining said sandwich assembly at said peripheral portions of said support plates and completely filling the pores of said peripheral portions to make said peripheral portions completely impermeable to the penetration of fluids therethrough.

2. The fuel cell component as defined in claim 1, wherein said sealing material is of the type that, during and after the formation of said body, does not release any volatile substances that would form escape passages in said body and thus compromise the fluid impermeability thereof.

3. The fuel cell component as defined in claim 2, wherein said sealing material is silicone rubber.

4. The fuel cell component as defined in claim 3, wherein said sealing material is SYLGARD® 170.

5. The fuel cell component as defined in claim 1, wherein said proton exchange membrane extends in between said peripheral portions of said support plates at least all the way to the outer peripheries thereof; and wherein said body fills the pore of said peripheral portions of both of said support plates and is sealingly joined with said proton exchange membrane.

6. The fuel cell component as defined in claim 1, wherein said proton exchange membrane extends in between said peripheral portions of said support plates but terminates short of the outer peripheries thereof, leaving a gap between said peripheral portions; and wherein said body fills said gap to peripherally encapsulate said proton exchange membrane.

7. A support plate for a proton exchange membrane fuel cell, comprising
    a porous support body including a central portion and a peripheral portion integral with and circumferentially completely surrounding said central portion; and
    a circumferentially complete sealing body of elastomeric sealing material completely filling the pores of said peripheral portion to make said peripheral portion completely impermeable to penetration of fluids therethrough.

8. The support plate as defined in claim 7, wherein said sealing material is of the type that, during and after the formation of said sealing body, does not release any volatile substances that would form escape passages in said peripheral portion and thus compromise the fluid impermeability thereof.

9. The support plate as defined in claim 8, wherein said sealing material is silicone rubber.

10. The support plate as defined in claim 9, wherein said sealing material is SYLGARD® 170.

* * * * *